US012629906B2

(12) United States Patent
Icenogle et al.

(10) Patent No.: US 12,629,906 B2
(45) Date of Patent: May 19, 2026

(54) SYSTEM AND METHOD TO MANUFACTURE A CONTACT LENS WITH AN EMBEDDED ELEMENT

(71) Applicant: Alcon Inc., Fribourg (CH)

(72) Inventors: David Andrew Icenogle, Brookhaven, GA (US); Joseph Michael Lindacher, Suwanee, GA (US)

(73) Assignee: Alcon Inc., Fribourg (CH)

( * ) Notice: Subject to any disclaimer, the term of this patent is extended or adjusted under 35 U.S.C. 154(b) by 231 days.

(21) Appl. No.: 18/373,366

(22) Filed: Sep. 27, 2023

(65) Prior Publication Data

US 2024/0100791 A1 Mar. 28, 2024

Related U.S. Application Data

(60) Provisional application No. 63/410,654, filed on Sep. 28, 2022.

(51) Int. Cl.
*B29D 11/00* (2006.01)

(52) U.S. Cl.
CPC .. *B29D 11/00951* (2013.01); *B29D 11/00125* (2013.01)

(58) Field of Classification Search
CPC ................... B29D 11/00951; B29D 11/00125
See application file for complete search history.

(56) References Cited

U.S. PATENT DOCUMENTS

2014/0268020 A1 9/2014 Pugh et al.

FOREIGN PATENT DOCUMENTS

KR 102111261 B1 5/2020

*Primary Examiner* — Mathieu D Vargot
(74) *Attorney, Agent, or Firm* — Jian Zhou

(57) ABSTRACT

A system and method for automated production of a hybrid lens product comprising a lens insert embedded within a lens body. The system preferably includes a first carrier for holding at least one first mold half, a second carrier for holding at least one lens insert, and a third carrier for holding at least one second mold half. The system preferably also includes an automated movement enabling pick-and-place subassembly for positioning a lens insert within a first mold half, and for engaging a second mold half with a first mold half.

20 Claims, 8 Drawing Sheets

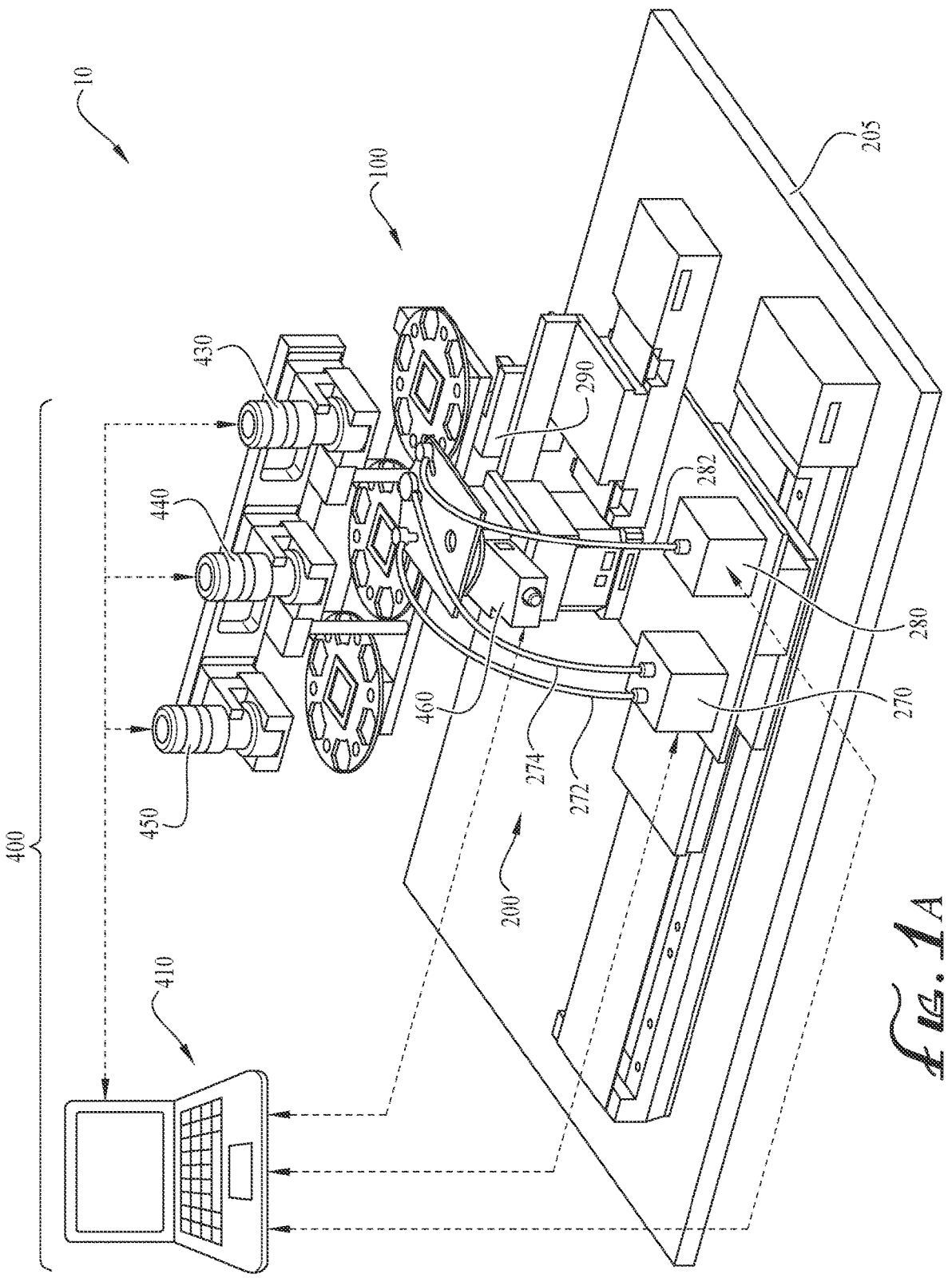
_Fig. 1A_

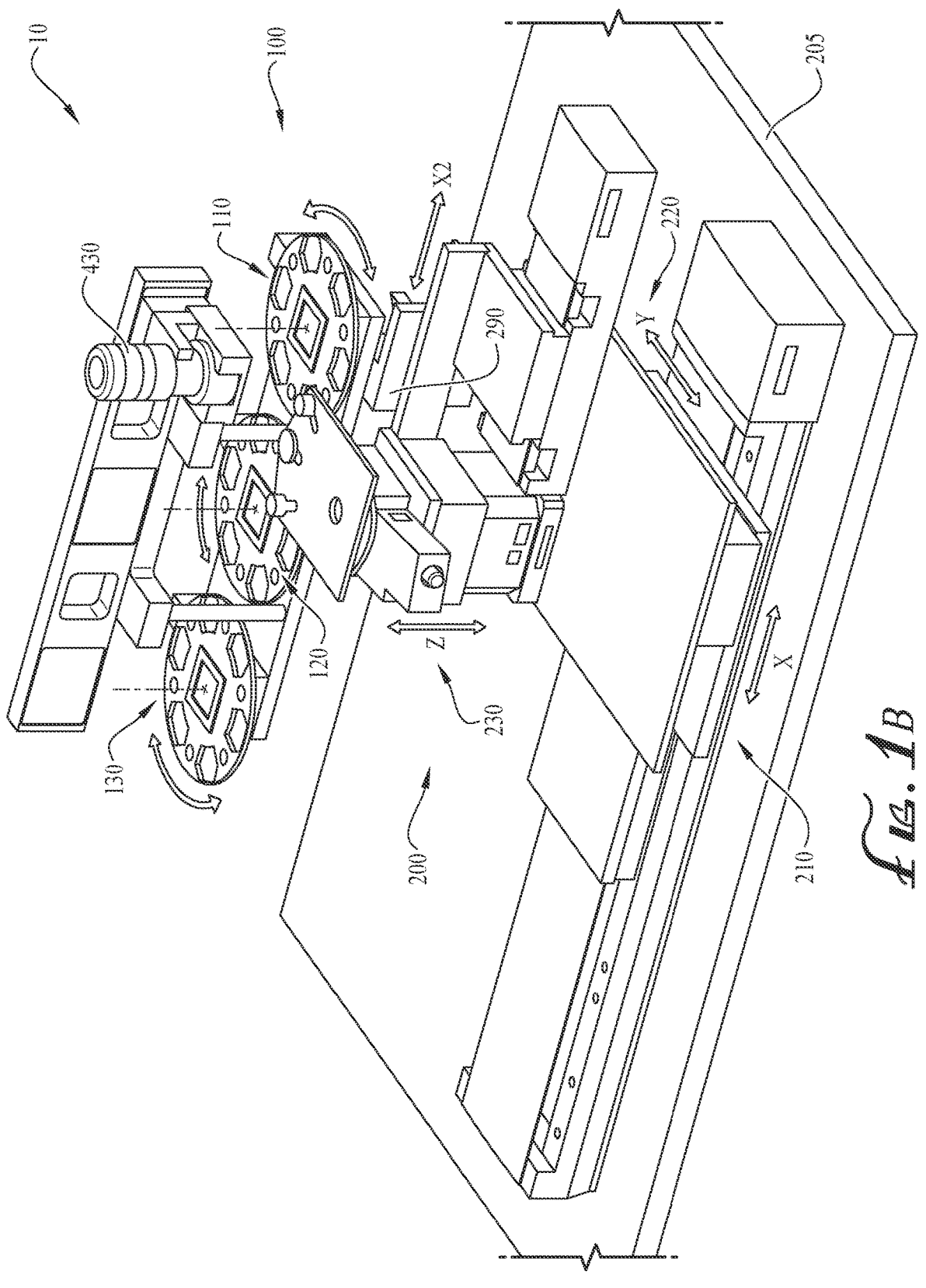
_Fig. 1B_

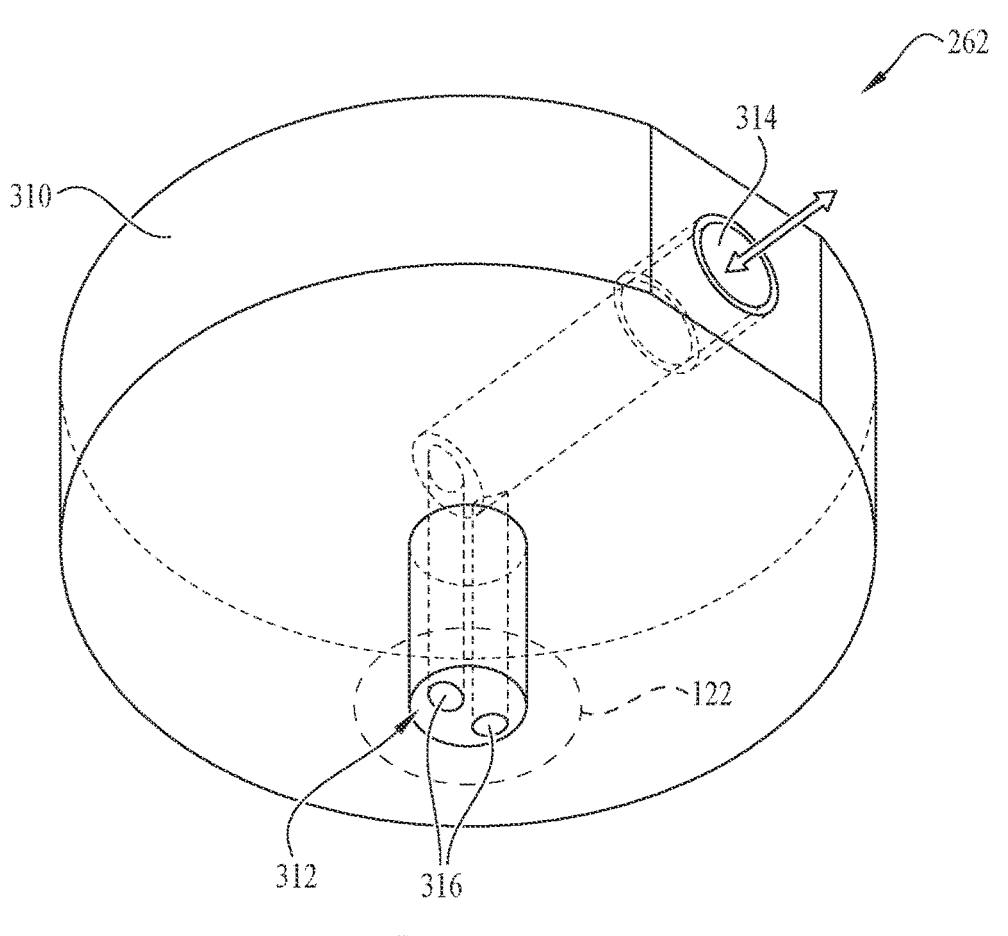
_Fig. 2A_
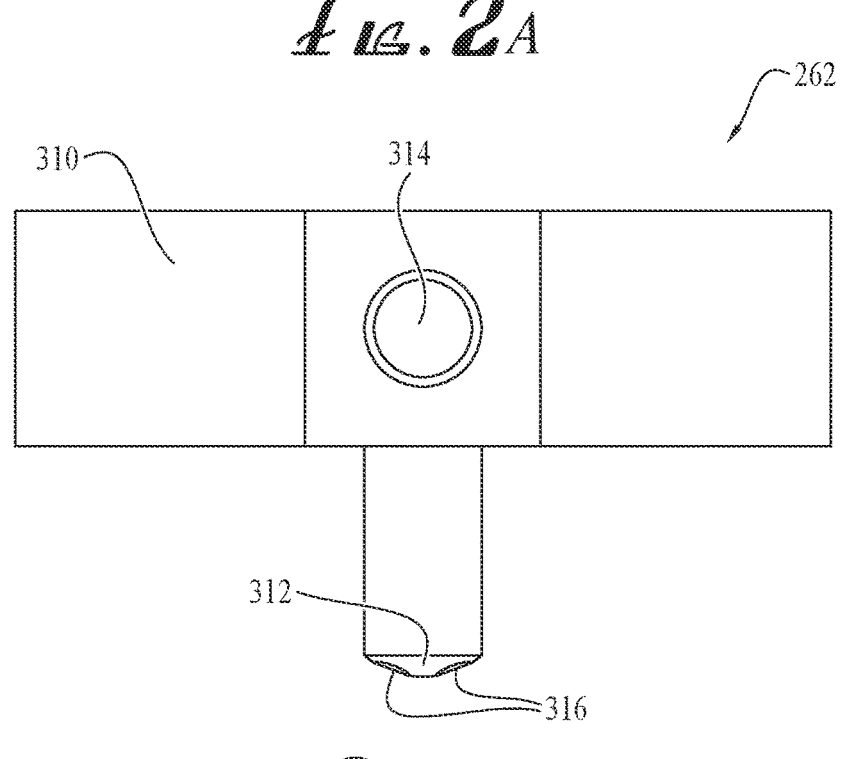
_Fig. 2B_

SYSTEM AND METHOD TO MANUFACTURE A CONTACT LENS WITH AN EMBEDDED ELEMENT

This application claims the benefits under 35 USC § 119 (e) of U.S. provisional application No. 63/410,654, filed on 28 Sep. 2022, incorporated by reference in its entirety.

TECHNICAL FIELD

The present invention relates generally to the field of fabrication of products including ophthalmic contact lenses, and more particularly to systems and methods for automated manufacturing of contact lenses with an embedded lens element or insert.

BACKGROUND

Optical contact lenses and other ophthalmic lens products may be fabricated by delivery of one or more lens forming materials such as uncured monomeric lens precursor material(s) into a mold or other forming device or structure, curing the materials to form a polymeric contact lens or other product, and demolding the lens or other product for further treatment or use. In some particular examples, it may be desirable to manufacture a hybrid lens product having an insert portion or embedded lens element formed of a different material than the main lens body, which is embedded within the molded lens product. For example, a hybrid contact lens may include a lens insert portion formed of a first material, which is embedded within a lens body formed of a second material. In example embodiments, the first and second materials have different material properties, such as for example, different indexes of refraction, different photochromic properties, different tints, different optical light transmissibility, different hardness, time-release drug eluting materials, etc.

Precise placement or positioning of the embedded lens element within the lens body can significantly improve the performance of a hybrid contact lens, and inaccurate placement can negatively affect performance. Some previously known systems and methods for fabrication of hybrid contact lenses, including voxel-based lithography, 3-D printing, and lathe cutting may disadvantageously require complex equipment and manufacturing processes that are not well suited to high-volume automated production. And some previously known systems and methods utilizing post structures on the front curve of the lens mold to support the insert during molding typically leave holes or material discontinuities on the surface of the lenses produced, which may render them prone to bacteria growth and/or user discomfort. Some previously known systems and methods may also produce lenses having poor concentricity between embedded elements and the contact lens, which can lead to optical disturbances and contact lens fit issues. And due to the precise placement and positioning specifications for embedded lens elements or lens inserts, known manufacturing processes are typically slow and not well suited to automation.

Accordingly, it can be seen that needs exist for improved automated systems and methods for forming a hybrid contact lens or other ophthalmic lens product with an embedded lens element or insert. It is to the provision of improved systems and methods meeting these and other needs that the present invention is primarily directed.

SUMMARY

In example embodiments, the present invention provides improved automated systems and methods for forming a hybrid contact lens or other ophthalmic lens product with an embedded lens element or lens insert. Some particular example embodiments include automated handling of molds for forming the front and back surfaces of the contact lens; automated handling of the embedded lens elements; computer vision to detect the XY positions of the molds and embedded elements with high accuracy; an optical gauge to measure the distance between or Z positions of the embedded elements, plastic molds, and end effectors to ensure; high accuracy stages and control of multiple axes in XYZ directions; and/or in place actinic curing (i.e., curing by using UV and/or visible light) of the embedded element to fix its position prior to final dosing of the overall contact lens.

Example embodiments of the manufacturing method and system design of the present disclosure achieve or produce a contact lens having an embedded element with excellent concentricity between the embedded element and the overall contact lens. Example embodiments of the manufacturing method and system produce lenses without any significant exterior surface discontinuities such as post-holes or other small features or manufacturing artifacts on the lens surface that may be undesirable from a clinical perspective. Example embodiments of the manufacturing method and system produce lenses in an efficient automated manner, with high production yields and no significant clinically undesirable features on the lens surface.

Example embodiments according to the present disclosure can be used to manufacture various types of embedded element lenses and/or other present or future hybrid contact lenses other ophthalmic lens products with an embedded lens element or insert. This may include, for example and without limitation, lenses with an embedded element to achieve the diffractive optics in a contact lens (improved multifocal performance), astigmatism masking geometries, and/or photochromic lenses with tint change only in the optical zone.

In one aspect, the present invention relates to a system for automated production of a hybrid lens product comprising a lens insert embedded within a lens body. The system preferably includes a first carrier for holding at least one first mold half, a second carrier for holding at least one lens insert, and a third carrier for holding at least one second mold half. The system preferably also includes an automated movement enabling pick-and-place subassembly for positioning a lens insert within a first mold half, and for engaging a second mold half with a first mold half.

In another aspect, the invention relates to a system for automated production of an ophthalmic lens product. The system preferably includes a computer-automated control system, at least one rotary and/or linear movement stage in electronic communication with the control system for rotational and/or linear movement of components for forming the ophthalmic lens product, and at least one linear actuator in electronic communication with the control system for linear movement of the components for forming the ophthalmic lens product.

In still another aspect, the invention relates to a method of automated production of a hybrid lens product comprising a lens insert embedded within a lens body. The method preferably includes the steps of moving a first mold half into an active position, depositing a lens body forming material into the first mold half, positioning a lens insert within the first mold half by operation of a computer-controlled actuator, and curing the lens body forming material to form a partial hybrid lens product with the lens insert partially embedded therein. After which the lens insert is released and additional lens body forming material is deposited to completely embed the lens insert. Then the second mold half would be closed with the first mold half, after which the lens would proceed to final curing.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1A is a perspective view of a system to manufacture contact lenses having embedded lens elements according to an example embodiment of the present invention.

FIG. 1B is a perspective view of the system of FIG. 1A, schematically showing system operation and motion of various elements according to an example method of operation to manufacture contact lenses having embedded lens elements according to an example embodiment of the present invention.

FIGS. 2A and 2B are detailed views of a vacuum delivery and insert placement head component of the system of FIG. 1A, according to an example embodiment of the present invention.

DETAILED DESCRIPTION OF EXAMPLE EMBODIMENTS

Figure 1C:
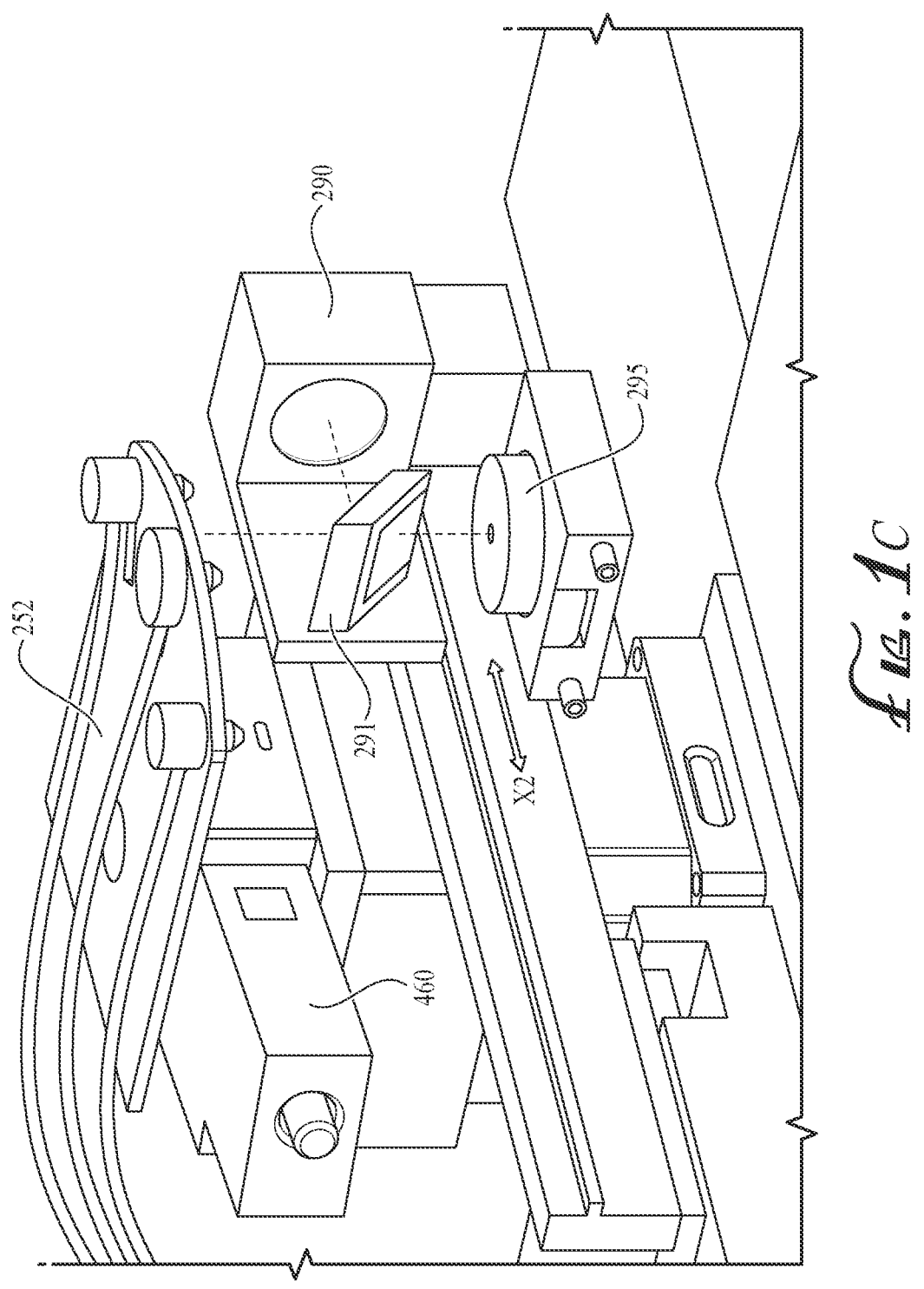
FIG. 1C is a detailed perspective view showing additional components of the system of FIG. 1A.
Figure 1D:
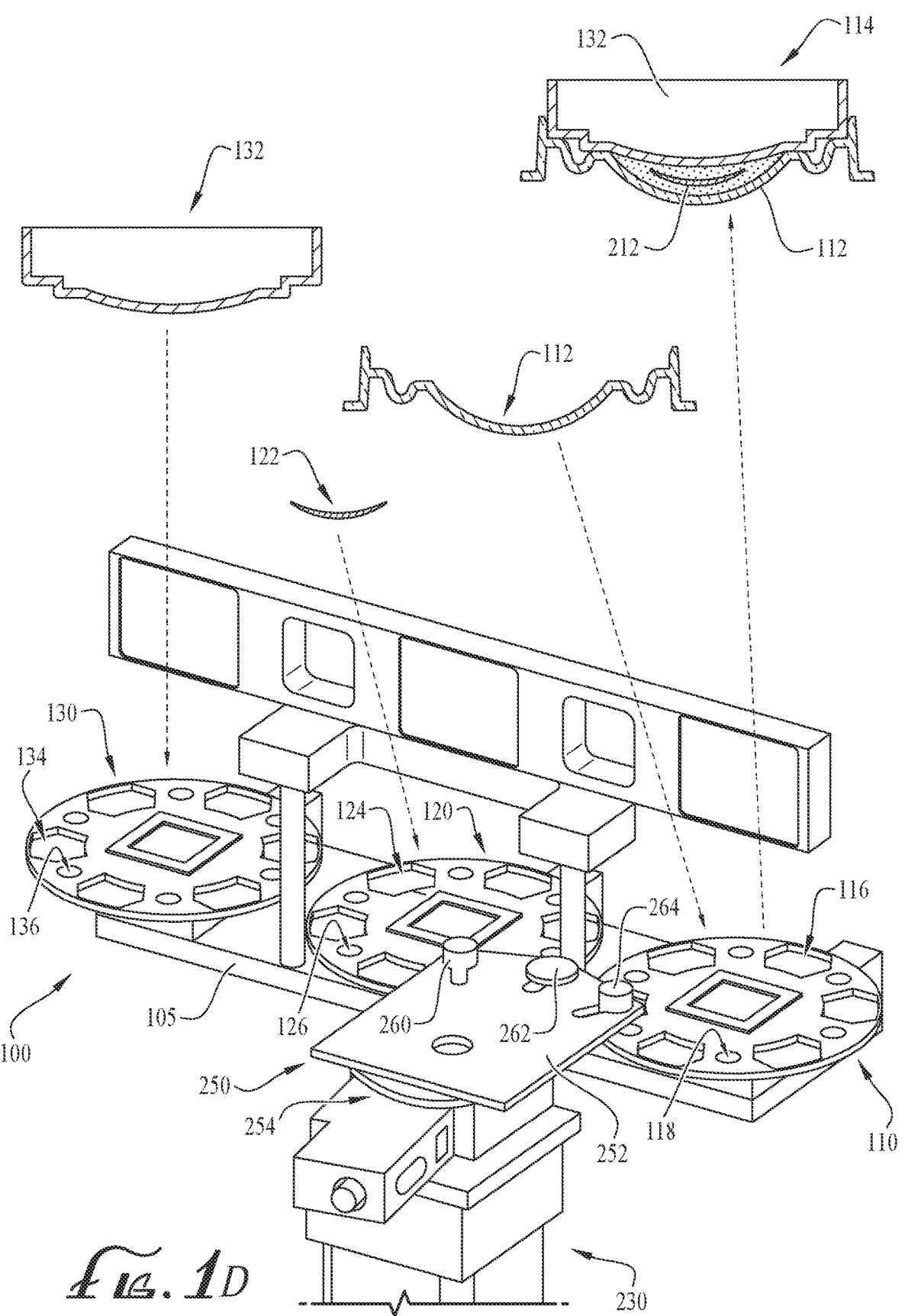
FIG. 1D is a detailed perspective view of component carousel carriers and pick-and-place effectors portions of the system of FIG. 1A, according to an example embodiment of the present invention.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1A, 1B, 1C and 1D show an automated system 10 to manufacture contact lenses having embedded lens elements or lens inserts, according to an example embodiment of the present invention. The system generally includes a mold carrier or conveyor subassembly 100, a three-dimensional movement enabling pick-and-place subassembly 200, and a computer-implemented control subassembly 400.

The mold carrier-conveyor subassembly 100 generally comprises a plurality of carrier elements in the form of rotationally actuated turntables or platens mounted to or supported by one or more base or support platform elements 105. In example embodiments, the turntables or platens may comprise rotary stage systems such as motorized rotation stages, for example, Newport URS100BCC, Newport RGV100BL-S, and/or rotary stage equipment manufactured by Thorlabs, Aerotech, Physik Instrumente, Zaber, and/or other commercially available computer-controlled motor-driven rotary equipment.

In the depicted example embodiment, a first carrier platen or turntable 110 is rotationally mounted to the base 105, and configured to receive empty front curve or female lens mold halves 112, move the mold halves sequentially through an active lens-forming position, and to discharge completed lens mold assemblies 114 and/or completed lens products after lens molding. The first carrier platen 110 comprises a generally circular disc having a plurality of receiver openings 116 configured to hold the female lens mold halves 112 or carriers for the mold halves, and a plurality of position-indicating openings 118 arranged in an evenly-spaced, alternating array or pattern.

The second carrier platen or turntable 120 is rotationally mounted to the base 105 adjacent or near the first carrier platen 110 and configured to receive previously formed lens insert elements 122, and move the lens inserts sequentially into an active position where they are picked up and moved to be placed into the lens molds 112 by the pick-and-place subassembly 200. The second carrier platen or turntable 120 comprises a generally circular disc having a plurality of receiver openings 124 configured to hold the lens insert elements 122 or carriers for the lens insert elements, and a plurality of position-indicating openings 126 arranged in an evenly-spaced, alternating array or pattern.

The third carrier platen or turntable 130 is rotationally mounted to the base 105 adjacent or near the first and/or second carrier platens 110, 120 and configured to receive base curve or male lens mold halves 132, and move those mold halves sequentially into an active position to be picked up and moved into engagement with the female lens molds 112 by the pick-and-place subassembly 200 during lens production. The third carrier platen or turntable 130 comprises a generally circular disc having a plurality of receiver openings 134 configured to hold the male lens molds 132 or carriers for the male lens molds, and a plurality of position-indicating openings 136 arranged in an evenly-spaced, alternating array or pattern.

In example embodiments, the rotational carrier elements 110, 120, 130 are arranged side-by-side, in a co-planar linear array, with their axes of rotation aligned in line and parallel with one another and generally equally spaced a short distance from one to the next. Alternatively, the rotational carrier elements may be arranged in an arcuate or angularly offset array relative to one another; in a vertically stacked, coaxial arrangement; or in various other configurations. In still further example embodiments, a single rotational carrier element may comprise receivers configured for holding any two or all three of the female mold half 112, lens insert 122, and male mold half 132 parts in a mixed array.

The three-dimensional pick-and-place subassembly 200 comprises a base platform 205, linear actuators 210, 220, 230 for movement in three-dimensional orthogonal X, Y and Z directions or axes, respectively, as indicated in FIG. 1B, and a vacuum pickup arm 250. Each of the X, Y and Z axis linear actuators 210, 220, 230 may comprise electromagnetic drive actuators, belt drive actuators, rail and slider actuators, pneumatic or hydraulic cylinder actuators, servo motor drive actuators, gear drive actuators, and/or other forms of actuators to move the system equipment along a range of motion in a precisely controlled manner between a first position and a second position along X, Y and Z axes. In particular example embodiments, the X, Y and Z axis linear actuators 210, 220, 230 may comprise Newport GTS70V (vertical), Newport M-IMS1000LM-S (linear), Newport M-ILS300LM-S (linear), Thorlabs, Aerotech, Physik Instrumente, Zaber, and/or other commercially available linear actuator equipment.

In the depicted example embodiment, the vacuum pickup arm 250 comprises a carrier plate 252 rotationally mounted via a motorized rotary actuator stage 254 to the Z-axis linear actuator 230, and one or more end effectors. First and second vacuum pickup head end effectors 260, 262 are mounted to the carrier plate 252—one for picking up and positioning the lens inserts 122 from receivers 124 in the second rotational carrier 120 and positioning the lens inserts in the female mold halves 112, and the other for picking up and positioning the male mold halves 132 from receivers 134 in the third rotational carrier 130 and positioning the male mold halves into the female mold halves, during lens production. A liquid delivery head end effector 264 is also mounted to the carrier plate 252 for dosing lens-forming material into the molds during lens production.

In example embodiments, the system further comprises an air/vacuum delivery pump 270, coupled to the first and second vacuum pickup heads 260, 262 by tubing or other fluid delivery conduits 272, 274, for applying a vacuum and/or delivery of pressurized air to the vacuum pickup heads to engage and release the lens inserts 122 and the male mold halves 132 during lens production. Optionally, the air/vacuum delivery pump 270 may be a variable or multistage pump configured to deliver variable positive pressure (blow-off) and variable negative pressure (suction or vacuum), for example to provide a stronger suction if needed to pick up a lens insert 122 out of its mold or carrier, a lighter suction while placing the insert into the female mold half 112, and a positive pressure airflow to detach the lens insert from the pickup head after placement in the mold. The system preferably also includes a liquid dosing pump 280, coupled to the liquid delivery head 264 by tubing or other fluid delivery conduit 282, for dosing or delivery of lens-forming material into the molds during lens production. In particular example embodiments, the liquid dosing pump 280 may be, for example, a Harvard Apparatus syringe pump, KD Scientific syringe pump, Burkert dosing pump, Nordson EFD dispensing pump, Nordson Ultimus V High Precision Dispenser, Harvard Apparatus Satellite Infuse/Withdraw PHD ULTRA™ syringe pumps, or other commercially available liquid dosing pump equipment.

In example embodiments, the system further comprises at least one light source, such as a light projector 290, as shown in further detail in FIG. 1C, for delivery of ultraviolet (UV)

and/or visible light to cure the lens-forming material in the molds (which in example embodiments are at least partially UV and/or visible light-transmissive to allow photo-curing through the molds), and/or for back-lighting for the one or more cameras of the digital imaging and analysis system of the computer-implemented control subassembly 400. Optionally, the light source(s) 290 may be mounted to move with the X and Y axis linear actuators 210, 220, and further optionally with the Z axis linear actuator 230, to allow the light to be moved horizontally and/or vertically for use at different stages of the lens manufacturing process. Alternatively, multiple light sources may be provided, with separate light sources for curing the lens forming material and for the digital imaging system. In still further alternate embodiments, one or more mirrors or lenses may be provided to direct light from the light source(s) to the desired station(s) of the system 10. For example, in the depicted embodiment of FIG. 1C, a second X-direction linear actuator is provided to move components along an axis parallel to and spaced a distance from the primary X-direction axis, indicated by reference arrow X2. Light source 290 is mounted to a carriage or platform translationally coupled to the linear actuator to move along the X2 axis. A dichroic mirror 291 is optionally provided, for example oriented at a 45° angle relative to the X2 axis. An optical probe or sensor 295 is optionally also mounted to move along the X2 axis. The dichroic mirror 291 is optionally configured to allow laser light from the optical probe 295 to pass through for optical sensor functionality, and to reflect light from light source 290 for backlight imaging or positioning analysis, and/or curing functionality.

An example embodiment of a computer-implemented control subassembly 400 for the system 10 is shown in FIG. 1A. The system includes a computer or other microprocessor-based system 410 configured to execute software code stored in a transitory or non-transitory computer-readable medium or media resident the system or in electronic communication therewith. The control system 400 optionally further comprises one or more (three are shown in FIG. 1A) digital imaging devices or cameras 430, 440, 450, in electronic communication with the computer 410, and configured to collect image data from one or more stages of the system 10 and communicate data to and from the computer. In some embodiments, multiple imaging devices may be provided to separately image different stages of the system, and in other embodiments a single imaging device may be carried by motion actuators to image different stages of the system. The control system 400 optionally further comprises one or more position and/or proximity sensors in electronic communication with the computer 410, for example to detect positions of the rotational and/or linear motion actuator stages of the system 10, to detect presence or absence of workpieces such as the lens molds and lens inserts, to measure distances between surfaces of components, to control process timing, etc., and to communicate associated data to and from the computer.

FIGS. 2A and 2B show an example embodiment of a vacuum or suction pickup head 262 configured for releasably engaging the lens inserts 122 to retrieve the inserts from receivers 124 of the second rotary carrier platen or turntable 120 and deliver and position the lens inserts within the female lens mold halves 112. The vacuum pickup head 262 comprises a body 310 having a smoothly curved arcuate or radiused convex hemispherical lower contact surface 312 for engagement with the back curve of the lens inserts 122, a vacuum/air conduit or duct 314 extending at least partially through the body for fluid communication with an external vacuum/air source such as the air/vacuum delivery pump 270, and one or more (two are shown) vacuum or suction ports 316 in the lower contact surface 312, in fluid communication with the vacuum conduit 314 for suction pickup of the lens inserts 122. The vacuum/air ports 316 are preferably near the pickup tip but off center to allow the optical gauge system to get a signal back from the tip of the lens insert on the pickup tip to ensure safe pickup and accurate positioning of the lens insert in the Z direction. The lower contact surface 312 preferably has an optical level or optical grade surface finish, for example, a surface roughness of less than about 0.1 μm Ra or less for a mirror/optical finish on the part, to minimize or prevent scratching or marring the lens insert surface. The lower contact surface 312 preferably also has a radius of curvature approximately equal to or slightly less than the radius of curvature of the lens inserts to be carried, to avoid or minimize distortion of the lens insert. In example embodiments, the radii of curvature may range from about 4-10 mm, and in particular example embodiments the radii of curvature may range from about 6-8 mm.

In some example embodiments, the pickup head 262 at least partially comprises a generally optically clear, transparent, semi-transparent or translucent material of construction to allow an electronic vision system to view and detect the presence and/or position of a lens insert 122 through the body 310 of the pickup head. In particular example embodiments, the pickup head 262 may at least partially comprise an acrylic material such a poly(methyl methacrylate) (PMMA), polycarbonate, Ultem™ or other polyetherimide, clear polyvinyl chloride (PVC), fluorinated ethylene propylene (FEP), or other plastic or polymeric material. Alternatively, the pickup head 262 may at least partially comprise a glass or ceramic material, or stainless steel or other metallic material that is chemically resistant to the lens forming material formulation. In embodiments that are not sufficiently optically light transmissive to allow vision system detection through the pickup head, visualization may be enabled by providing a pickup head with a diameter or other dimension that is smaller than the corresponding dimension of the lens insert, such that the edges of the lens insert can be visualized extending beyond the periphery of the pickup head. For example, visualization of the lens insert may be achieved with a very narrow stainless steel pickup head design that has a pickup head diameter of at least about 2 mm smaller in diameter than the inserts being picked up. In particular embodiments, pickup head diameters of 3-8 mm diameter may be used with lens inserts having diameters of 5-10 mm diameter, respectively.

FIGS. 3A-3F show a sequence of steps in an example method of production of a hybrid optical lens product, for example an ophthalmic contact lens, having a lens insert element embedded within the overall lens body, using a system according to an example embodiment of the present invention. With reference back to FIG. 1D, one or more front surface mold halves 112 are loaded into receivers 116 of the first rotary carrier 110, one or more lens insert embedded elements 122 are loaded into receivers 124 of the second rotary carrier 120, and one or more back surface mold halves loaded into receivers 134 of the third rotary carrier 130. In example embodiments, these lens forming components and workpieces may be loaded into the respective carriers by an automated conveyor or transport system, or alternatively may be manually or otherwise loaded.

The computer control system 400 directs the three-dimensional pick-and-place subassembly 200 and/or the rotary actuator stage 254 to move the carrier plate 252 to a position with its associated liquid delivery head end effector 264 centered over a front surface mold half 112 in an active lens-forming position in the first rotary carrier 110. A camera 430 or other positioning sensor may provide electronic feedback to the computer control system 400 to effect and confirm proper positioning of the liquid delivery head 264 over the active position female mold half 112.

Figure 3A:
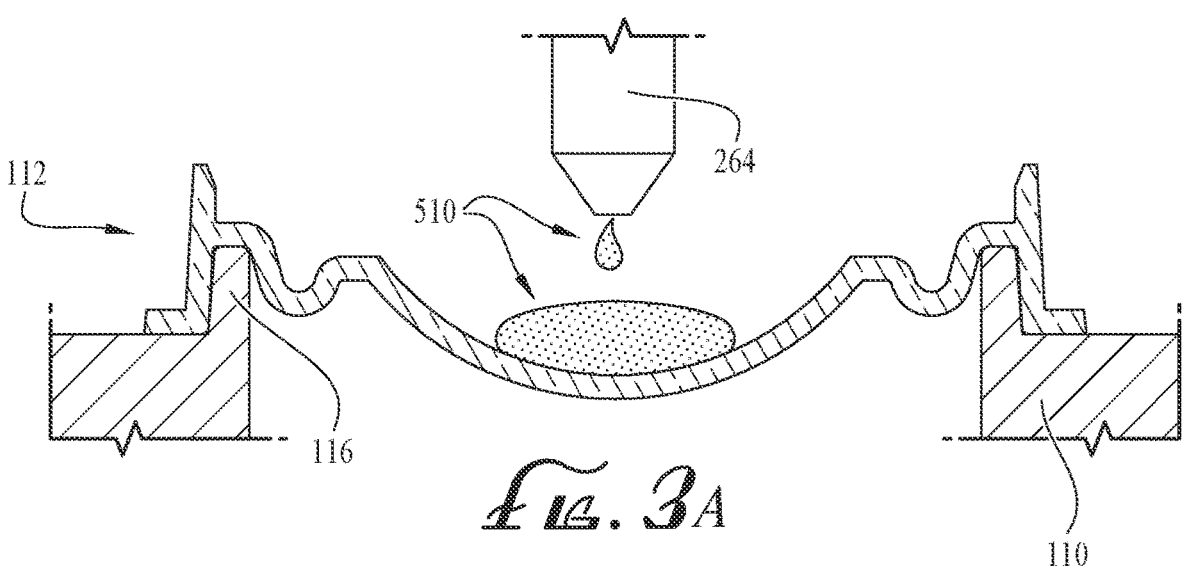
FIGS. 3A, 3B, 3C, 3D, 3E and 3F schematically show a sequence of lens mold-forming to produce a contact lens having an embedded lens element, to which example embodiments of the system and method of the present invention may be adapted.

The computer control system 400 then directs the liquid dosing pump 280 to deliver a first measured quantity or dose of lens body forming material 510, such as for example, a non-silicone hydrogel material (i.e., a hydrogel material free of silicone) or a silicone hydrogel (SiHy) material to be dosed into the front surface mold half 112 from the liquid delivery head 264, as shown in FIG. 3A. A "hydrogel" or "hydrogel material" refers to a crosslinked polymeric material which is insoluble in water, but can hold at least 10 percent by weight of water in its three-dimensional polymer networks (i.e., polymer matrix) when it is fully hydrated. As used in this application, the term "non-silicone hydrogel" refers to a hydrogel that is theoretically free of silicon. Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. The insert placement and positioning device 60 then delivers and positions the lens insert 180 into the desired position within the mold 40, as shown in FIG. 4B. As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups. Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

The computer control system 400 then directs the three-dimensional pick-and-place subassembly 200 and/or the rotary actuator stage 254 to move the carrier plate 252 to a position with its associated second vacuum pickup end effector 262 centered over a lens insert 122 in an active position in the second rotary carrier 120. A camera 440 or other positioning sensor may provide electronic feedback to the computer control system 400 to effect and confirm proper positioning of the vacuum pickup head 262 over the active position lens insert 122. The computer control system 400 then directs the three-dimensional pick-and-place subassembly 200 to lower the pickup head 262 into proximity with the lens insert 122, and directs the air/vacuum delivery pump 270 to operate to apply suction through the duct 314 and air/vacuum ports 316 to engage the lens insert onto the lower contact surface 312 of the pickup head and lift the lens insert from the carrier 120. Optionally, an optical gauge or other proximity or positional sensor such as optical sensor 295, may provide electronic feedback to the computer control system 400 to effect and confirm proper positioning of the lens insert 122 relative to the pickup head 262 for the pick and place process. In example embodiments, a laser displacement sensor optical gauge measures the air gap spacing between the lower contact surface 312 of the pickup head 262 and the surface of the lens insert 122 to move pickup head the distance of the air gap with micron or sub-micron accuracy to ensure minimal stress on the embedded element in the pick and place process. In embodiments comprising a transparent pickup head, the optical sensor may view the lens insert through the body of the pickup head to effect and confirm proper positioning. In alternate embodiments where the pickup head may not be transparent, the provision of a pickup head with a smaller diameter than the diameter of the lens insert allows the optical sensor to view the edges of the lens insert around the pickup head to effect and confirm proper positioning.

Figure 3B:
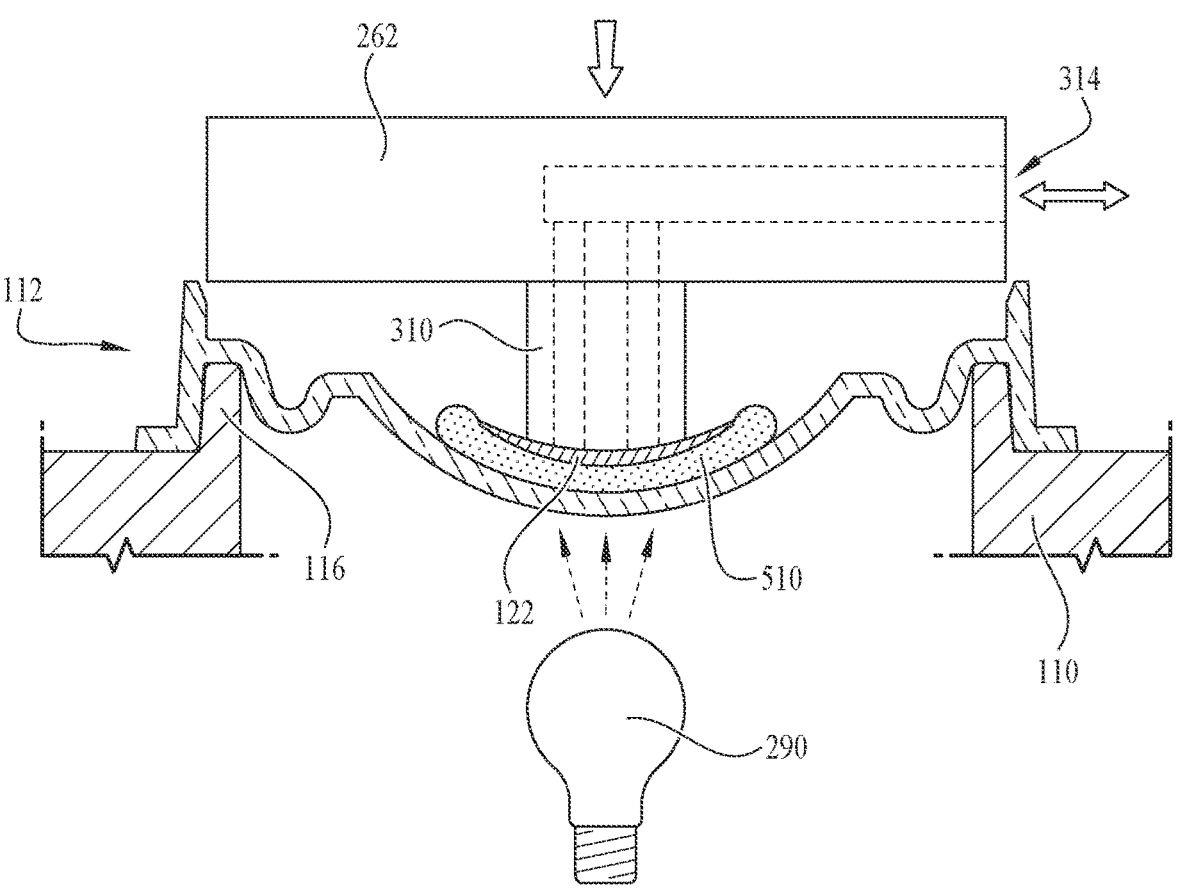

With reference now to FIG. 3B, the computer control system 400 then directs the three-dimensional pick-and-place subassembly 200 and/or the rotary actuator stage 254 to move the carrier plate 252 to a position with the pickup head 262 and the lens insert 122 carried thereon over the front surface mold half 112 into which the lens forming material 510 had previously been dosed. The computer control system 400 then directs the three-dimensional pick-and-place subassembly 200 and/or the rotary actuator stage 254 to move the pickup head 262 to position the lens insert 122 in precise alignment and positioning relative to the front surface mold half 112 and in contact with the lens forming material 510 contained therein. Optionally, an optical gauge or other proximity or positional sensor may provide electronic feedback to the computer control system 400 to effect and confirm proper positioning of the lens insert 122 for proper centering location of the lens insert in the mold 112 in the X-Y plane, and/or proper axial positioning of the lens insert in the mold in the Z-dimension. In example embodiments, the system calculates the distance to be moved to precisely locate and position the embedded lens insert element 122 relative to the front surface mold 112 within a tolerance of no more than 0.100 mm or better in the X, Y dimensions and 0.020 mm or better in the Z dimensions relative to the lens specification. Optionally, rotary carrier 110 may be rotated a half step to allow light from the light 290 or other light source to pass through a position indicating opening 118, and illuminate the lens insert and/or pickup head for electronic imaging and positional control via camera 430 or other electronic optical sensor(s), and the rotary carrier then rotated back into position under the lens insert and pickup head for placement of the lens insert into the mold.

Figure 3C:
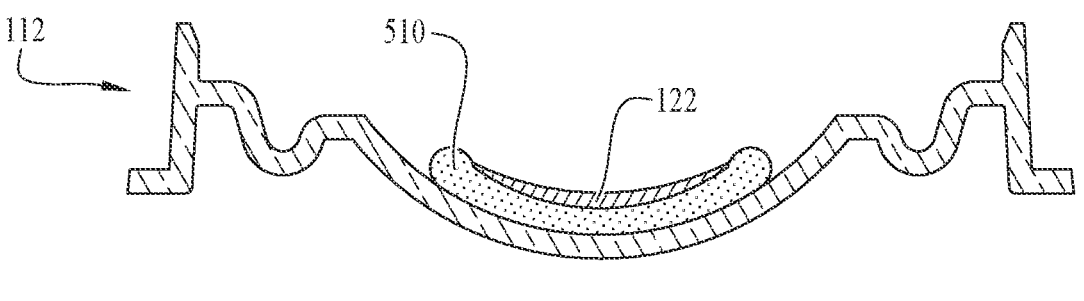

The computer control system 400 then directs a UV/visible light curing lamp or LED of the light source 290 or other source of UV/visible light to activate to at least partially cure the first dose of lens forming material 510 to fix the lens insert 122 in place within the mold 112 at the specified location and position. The air/vacuum delivery pump 270 is activated to deliver positive pressure air to detach the lens insert 122 from the lower contact surface 312 of the pickup head 262 as the three-dimensional pick-and-place subassembly 200 lifts the pickup head away from the mold 112, leaving the lens insert in place in the mold, as shown in FIG. 3C.

Figure 3D:
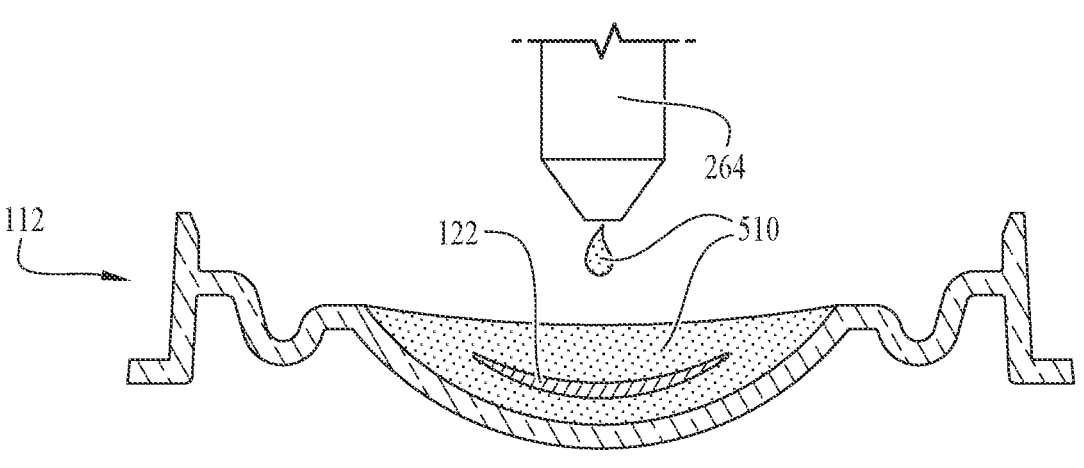

The computer control system 400 then directs the three-dimensional pick-and-place subassembly 200 and/or the rotary actuator stage 254 to move the carrier plate 252 to a position with the liquid delivery head 264 positioned over the female mold half 112. The computer control system 400 then directs the liquid dosing pump 280 to deliver a second measured quantity or dose of the lens body forming material 510 into the front surface mold half 112 from the liquid delivery head 264 to encapsulate the lens insert 122 within the lens forming material, as shown in FIG. 3D. In example embodiments, the second dose of the lens body forming material 510 may optionally be delivered after the pick-and-place mechanism has picked up the second mold half 132, but before placing it into the first mold half 112, in order to minimize the amount of time the dosed material is open to the air.

The computer control system 400 then directs the three-dimensional pick-and-place subassembly 200 and/or the rotary actuator stage 254 to move the carrier plate 252 to a position with the pickup head 260 centered over a base curve or male lens mold half 132 in an active position in the third rotary carrier 130. A camera 450 or other positioning sensor may provide electronic feedback to the computer control system 400 to effect and confirm proper positioning of the vacuum pickup head 260 over the male mold half 132. The computer control system 400 then directs the three-dimensional pick-and-place subassembly 200 to move the pickup head 260 into proximity with the male mold half 132 and directs the air/vacuum delivery pump 270 to operate to apply suction through the pickup head to engage the male mold half onto the pickup head and lift the male mold half from the carrier 130. Optionally, an optical gauge or other proximity or positional sensor may provide electronic feedback to the computer control system 400 to effect and confirm proper positioning of the male mold half 132 relative to the pickup head 260.

Figure 3E:
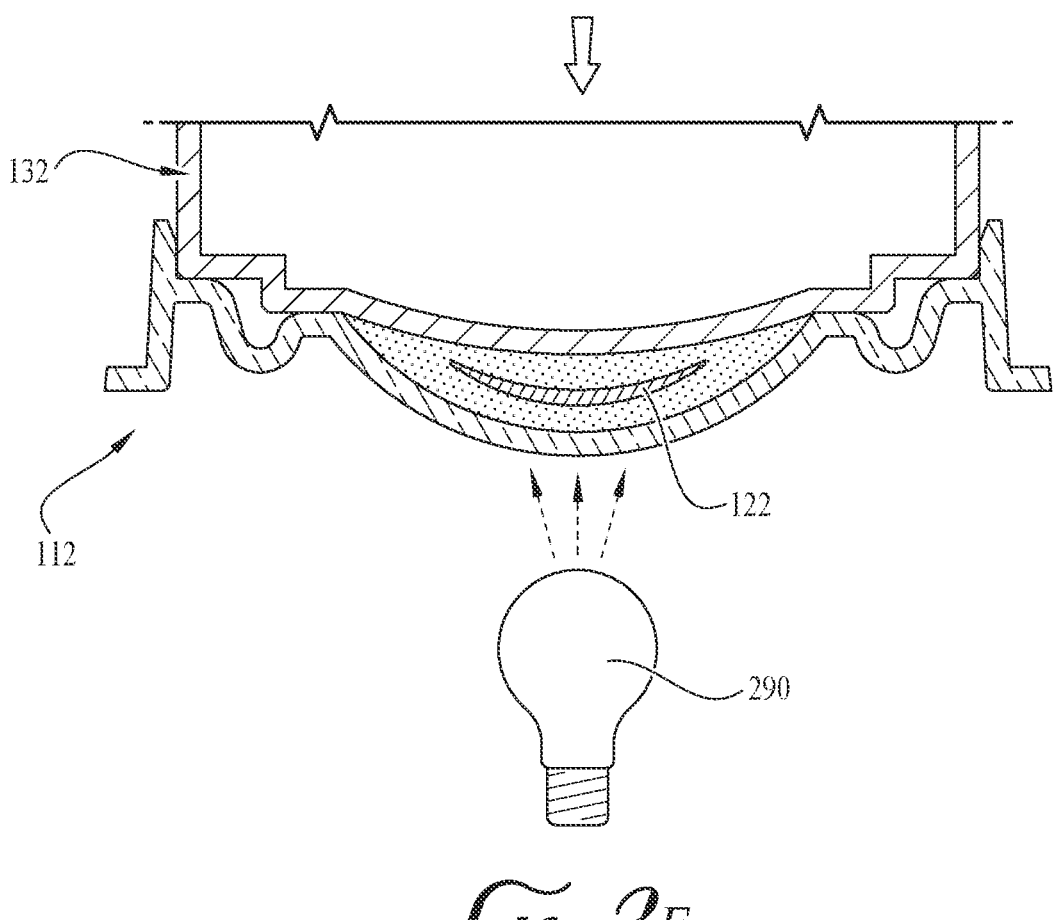

With reference now to FIG. 3E, the computer control system 400 then directs the three-dimensional pick-and-place subassembly 200 and/or the rotary actuator stage 254 to move the carrier plate 252 to a position with the pickup head 260 and the male mold half 132 carried thereon to a position centered over the female mold half 112 containing the lens insert 122 and the lens forming material 510. The computer control system 400 then directs the three-dimensional pick-and-place subassembly 200 and/or the rotary actuator stage 254 to lower the male mold half 132 into mating engagement with the female mold half 112. The computer control system 400 then directs the UV/visible light curing lamp or LED of light source 290 or other source of UV/visible light to activate and direct light through the mold for a sufficient time to fully cure the lens forming material 510.

Figure 3F:
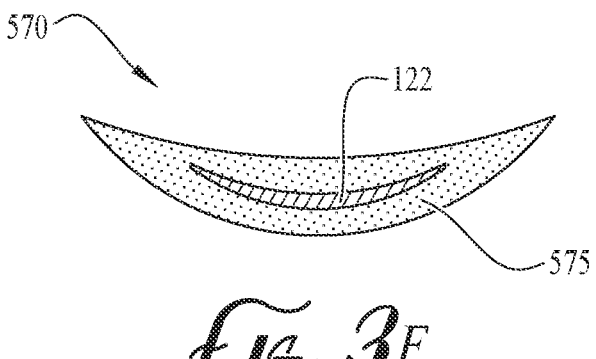

The computer control system 400 then directs the three-dimensional pick-and-place subassembly 200 and/or the rotary actuator stage 254 to move away from the mold, and the mold may then be discharged from the carrier 110. The completed lens product 570, comprising the lens insert 122 embedded within a lens body 575, as shown in FIG. 3F, may then be de-molded and removed for further processing and/or packaging.

In example embodiments, the carriers 110, 120, 130 may be rotated to advance the next male and female mold elements and the next lens insert into their respective active positions, to repeat the process cycle sequentially and provide a high-speed, automated lens manufacturing process, producing precision hybrid lens products with highly-accurate positioning and location of the embedded lens insert element within the overall lens body, without any openings (post-holes) or discontinuities in the exterior surface of the lens as typically may occur in hybrid lenses produced with posts to support the lens insert during the molding process. To advance the carriers 110, 120, 130 by one step and bring the next receiver 116, 124, 134 into the active position, the computer control system may use the position indicating openings 118, 126, 136 to allow passage of ambient light or light from a light source 290 to be sensed by one or more cameras 430, 440, 450 or other sensor(s) to provide feedback and effect automated control of the rotation of the carriers. As noted above, the lens insert may be formed of a harder, softer, or otherwise different material than the larger overall lens body; may have a different refractive index or optical power; or may comprise a photochromic material, colorant or tinting, and/or incorporate electronic elements such as a sensor for glucose monitoring or active optics. In example embodiments, the lens insert may be formed of, comprise, consist of, or consist essentially of a first material; and the lens body may be formed of, comprise, consist of, or consist essentially of a second material different from the first material. In particular example embodiments, the hybrid product is a hybrid contact lens having a rigid gas permeable (RGP) lens or non-rigid polymer or hydrogel insert fully enclosed or encapsulated by a silicone hydrogel (SiHy) carrier lens body, with intact external surfaces not having holes or discontinuities.

While the invention has been described with reference to example embodiments, it will be understood by those skilled in the art that a variety of modifications, additions and deletions are within the scope of the invention, as defined by the following claims.

What is claimed is:

1. A system for automated production of a hybrid lens product comprising a lens insert embedded within a lens body, the system comprising:

a mold carrier-conveyor subassembly which comprises a first carrier platen, a second carrier platen, and a third carrier platen, wherein the first platen comprises a first generally circular disc having a plurality of first receiver openings each configured to hold one female lens mold half and a plurality of first position-indicating openings arranged in an evenly-spaced, alternating pattern, wherein the second platen comprises a second generally circular disc having a plurality of second receiver openings each configured to hold one previously formed lens insert element and a plurality of second position-indicating openings arranged in an evenly-spaced, alternating pattern, wherein the third platen comprises a third generally circular disc having a plurality of third receiver openings each configured to hold one male lens mold half that is configured for cooperative engagement with one female lens mold half and a plurality of third position-indicating openings arranged in an evenly-spaced, alternating pattern, wherein each of the first, second and third carrier platens comprises one rotary stage system and is rotationally mounted adjacent or near at least one of the first, second and third carrier platens to a base so as to receive empty female lens mold halves, to move the empty female lens mold halves sequentially through an active lens forming position, and to discharge completed lens mold assemblies and/or completed lens products after lens molding;

a three-dimensional pick-and-place subassembly which comprises a platform, an X-axis linear actuator, a Y-axis linear actuator, a Z-axis linear actuator, and a vacuum pickup arm, wherein the vacuum pickup arm comprises a carrier plate rotationally mounted via a motorized rotary actuator stage to the Z-axis linear actuator, a first vacuum pickup head end effector mounted to the carrier plate for picking up and positioning the lens insert elements from the second carrier platen and positioning the lens insert elements in the female lens mold halves in the first carrier platen, a second vacuum head end effector mounted to the carrier plate for picking up and positioning the male lens mold halves from the third carrier platen and positioning the male mold halves into the female mold halves in the first carrier platen, and a liquid delivery end effector mounted to the carrier plate for dosing a lens-forming material into the female lens mold halves; and a computer-automated control subassembly in electronic communications with the mold carrier-conveyor subassembly and with the three-dimensional pick-and-place subassembly.

2. The system of claim 1, wherein the first carrier platen, the second carrier platen and the third carrier platen comprise a motor-driven rotary or linear carrier configured to rotationally or linearly advance the lens insert elements, the male lens mold halves and the female lens mold halves sequentially into an active mold-forming position.

3. The system of claim 1, wherein the first, second and third carrier platens are arranged side-by-side, in a co-planar linear array, with their axes of rotation aligned in line and parallel with one another and generally equally spaced a short distance from one to the next.

4. The system of claim 1, wherein the first, second and third carrier platens are arranged in an arcuate or angularly offset array relative to one another.

5. The system of claim 1, wherein the first, second and third carrier platens are arranged in a vertically stacked, coaxial arrangement.

6. The system of claim 1, wherein the X-axis, Y-axis and Z-axis linear actuators comprises electromagnetic drive actuators, belt drive actuators, rail and slider actuators, pneumatic or hydraulic cylinder actuators, servo motor drive actuators, and/or gear drive actuators to move the vacuum pickup arm along a range of motion in a precisely controlled manner between a first position and a second position along X, Y and Z axes.

7. The system of claim 6, further comprising at least one digital imaging device in electronic communication with the computer-automated control subassembly.

8. The system of claim 6, further comprising at least one optical sensor in electronic communication with the computer-automated control subassembly for precise positioning of the lens insert element within the female lens mold half.

9. The system of claim 1, wherein the three-dimensional pick-and-place subassembly further comprises a lens insert element pickup head carried by the first vacuum pickup head end effector.

10. The system of claim 9, wherein the lens insert element pickup head comprises a smoothly curved contact surface for engagement with the lens insert element.

11. The system of claim 10, further comprising an air/vacuum pump in fluid communication with at least one suction port formed in the smoothly curved contact surface.

12. The system of claim 9, wherein the lens insert element pickup head is at least partially transparent.

13. The system of claim 9, wherein the lens insert element has a lens insert diameter, and wherein the lens insert element pickup head has a pickup head diameter that is substantially less than the lens insert diameter.

13

14

14. The system of claim 1, further comprising a liquid dosing pump configured to deliver a lens body forming material into the female lens mold half.

15. The system of claim 1, further comprising at least one digital imaging device in electronic communication with the computer-automated control subassembly and at least one optical sensor in electronic communication with the computer-automated control system for precise positioning of the lens insert element within the female lens mold half, wherein the three-dimensional pick-and-place subassembly further comprises a lens insert element pickup head carried by the first vacuum pickup head end effector.

16. The system of claim 15, wherein the lens insert element pickup head comprises a smoothly curved contact surface for engagement with the lens insert element.

17. The system of claim 16, further comprising an air/vacuum pump in fluid communication with at least one suction port formed in the smoothly curved contact surface.

18. The system of claim 15, wherein the lens insert element pickup head is at least partially transparent.

19. The system of claim 15, wherein the lens insert element has a lens insert diameter, and wherein the lens insert element pickup head has a pickup head diameter that is substantially less than the lens insert diameter.

20. The system of claim 15, further comprising a liquid dosing pump configured to deliver a lens body forming material into the female lens mold half.

\* \* \* \* \*